Sept. 3, 1968 R. C. SCHWACOFER 3,399,703

ARTICHOKE PROCESSING MECHANISM

Original Filed Sept. 15, 1965 8 Sheets-Sheet 1

INVENTOR.
RAYMOND C. SCHWACOFER
BY Thomas D. Lauk
ATTORNEYS.

Sept. 3, 1968 R. C. SCHWACOFER 3,399,703

ARTICHOKE PROCESSING MECHANISM

Original Filed Sept. 15, 1965 8 Sheets-Sheet 2

INVENTOR.
RAYMOND C. SCHWACOFER
BY
Thomas D. Lane
ATTORNEYS.

INVENTOR.
RAYMOND C. SCHWACOFER
BY
Thomas D. Lane
ATTORNEYS.

ARTICHOKE PROCESSING MECHANISM

Original Filed Sept. 15, 1965 8 Sheets-Sheet 4

INVENTOR:
RAYMOND C. SCHWACOFER

BY Thomas D. Lane

ATTORNEYS.

ARTICHOKE PROCESSING MECHANISM

Original Filed Sept. 15, 1965 8 Sheets-Sheet 5

INVENTOR
RAYMOND C. SCHWACOFER
BY
Thomas D. Lowe
ATTORNEYS.

INVENTOR.
RAYMOND C. SCHWACOFER
BY Thomas D. Lowe
ATTORNEYS.

INVENTOR.
RAYMOND C. SCHWACOFER
BY
Thomas D. Lane
ATTORNEYS.

ARTICHOKE PROCESSING MECHANISM

Original Filed Sept. 15, 1965 8 Sheets-Sheet 8

INVENTOR.
RAYMOND C. SCHWACOFER
BY Thomas D. Laue
ATTORNEYS.

United States Patent Office 3,399,703
Patented Sept. 3, 1968

3,399,703

ARTICHOKE PROCESSING MECHANISM

Raymond C. Schwacofer, 23496 Sunset Drive, Los Gatos, Calif. 95030

Original application Sept. 15, 1965, Ser. No. 489,461, now Patent No. 3,374,881, dated Mar. 26, 1968. Divided and this application Jan. 15, 1968, Ser. No. 697,795
2 Claims. (Cl. 146—52)

ABSTRACT OF THE DISCLOSURE

An artichoke processing mechanism wherein an oil tight housing has a plurality of shafts journaled in axially parallel relation therein and interconnected by selected drive mechanism to a power drive mechanism. The mechanism includes a rock shaft having an indexing wheel journaled therein, and a plurality of selectively actuated artichoke gripping jaws, each jaw being mounted on a cam pin which can be rotatively adjusted and locked in adjusted position to provide a fine and easy adjustment for centering each pair of the jaws relative to processing stations located at selected positions around the indexing wheel. Oiling means oils all of the shaft bearings and other mechanism in the housing.

The present application is a division of my application for United States Patent, Ser. No. 489,461, filed Sept. 15, 1965, now Patent No. 3,374,881.

*Objects*

An object of the present invention is to provide an improved artichoke processing mechanism.

Another object of the invention is to provide an improved artichoke processing mechanism comprising an oil tight housing with support and bearing means provided therein, and oiling means for oiling the mechanism in the housing.

The foregoing objects and advantages of the invention will be apparent from the following description and the accompanying drawings, wherein.

*Brief description*

Figures 12, 13, 13A:
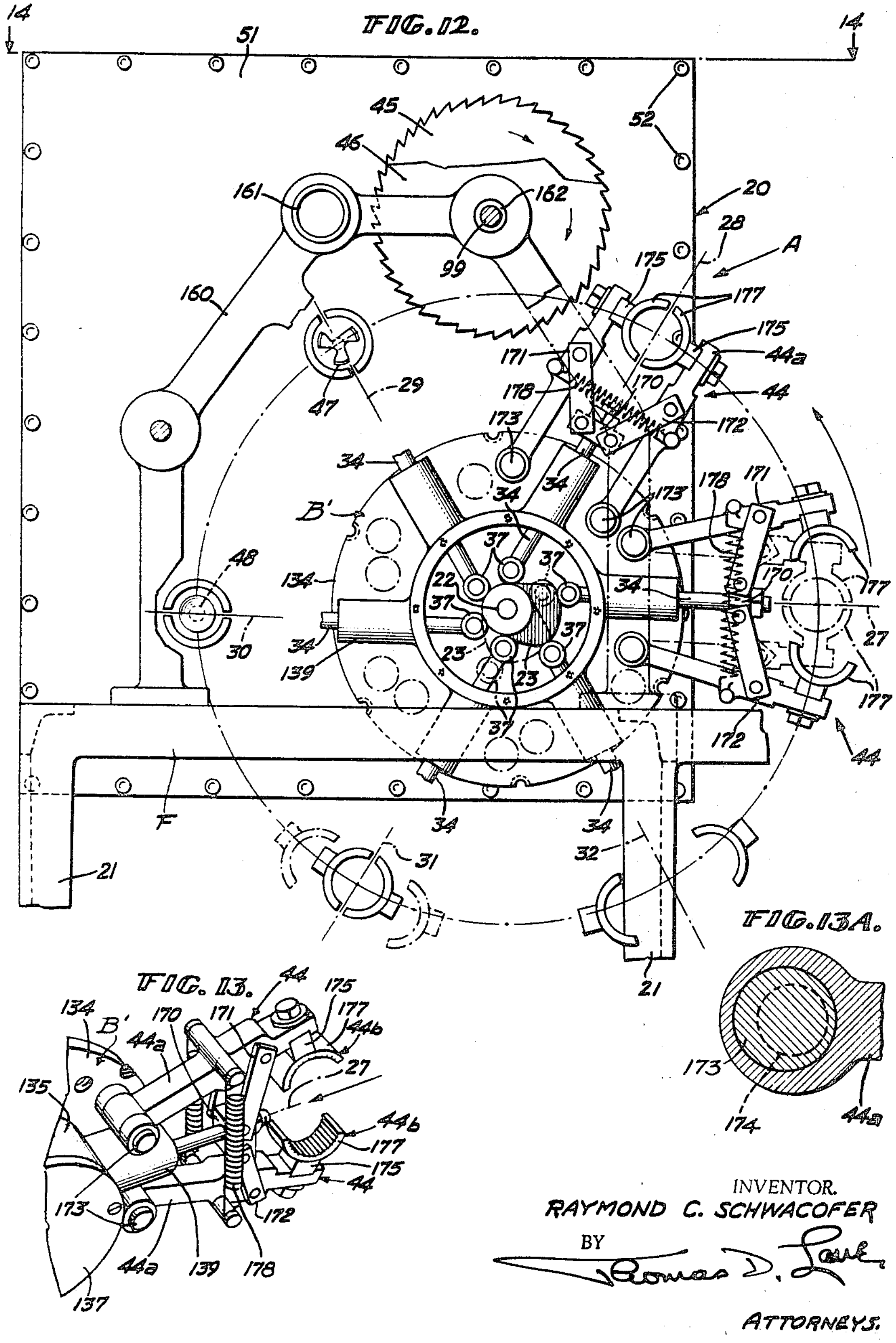
FIG. 12 is a fragmentary, side elevational view of the mechanism looking in the same direction as in FIG. 1, but with the mechanism set up for processing artichoke hearts.
FIG. 13 is a perspective view of one pair of the artichoke jaws of the type used in the mechanism as set up in FIG. 12.
FIG. 13A is an enlarged, sectional view taken along line 13A—13A of FIG. 14.
Figure 14:
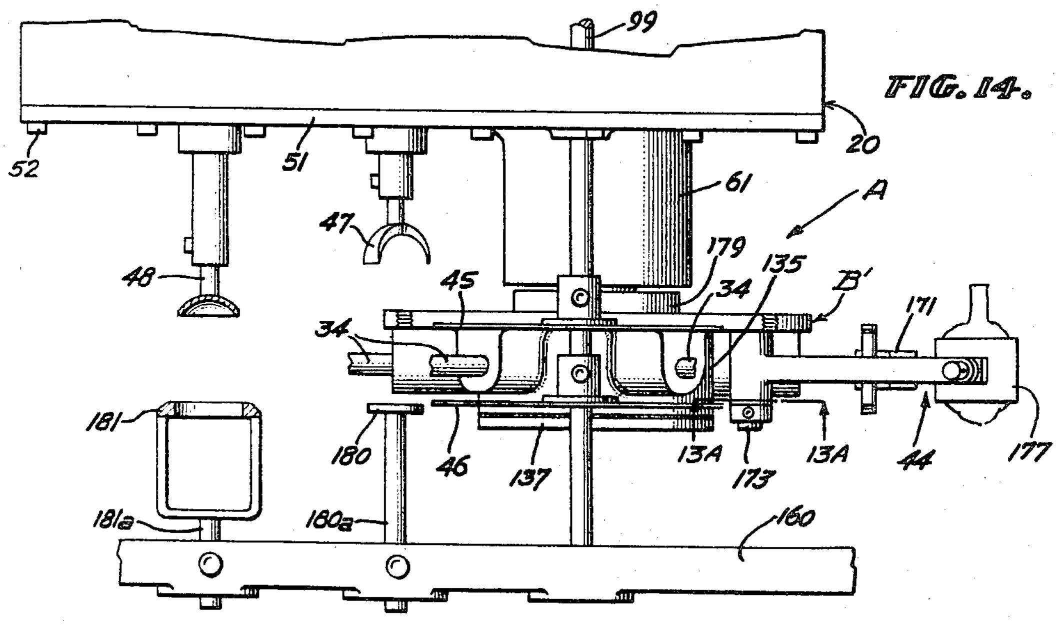
FIG. 14 is a fragmentary, top plan view of the mechanism as set up in FIG. 13, portions being broken away.
Figure 16:
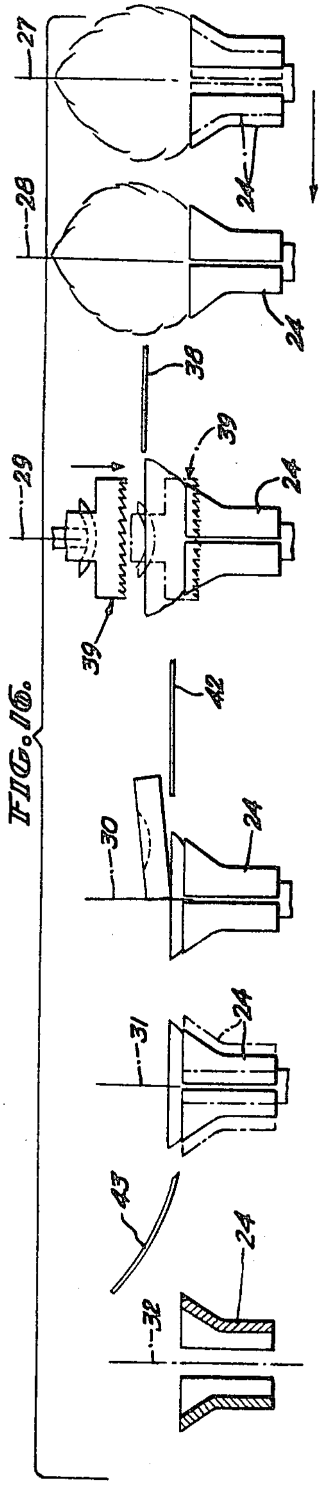
FIG. 16 is a straight line diagram showing successive steps in the processing of artichoke bottoms.
Figures 17, 18:
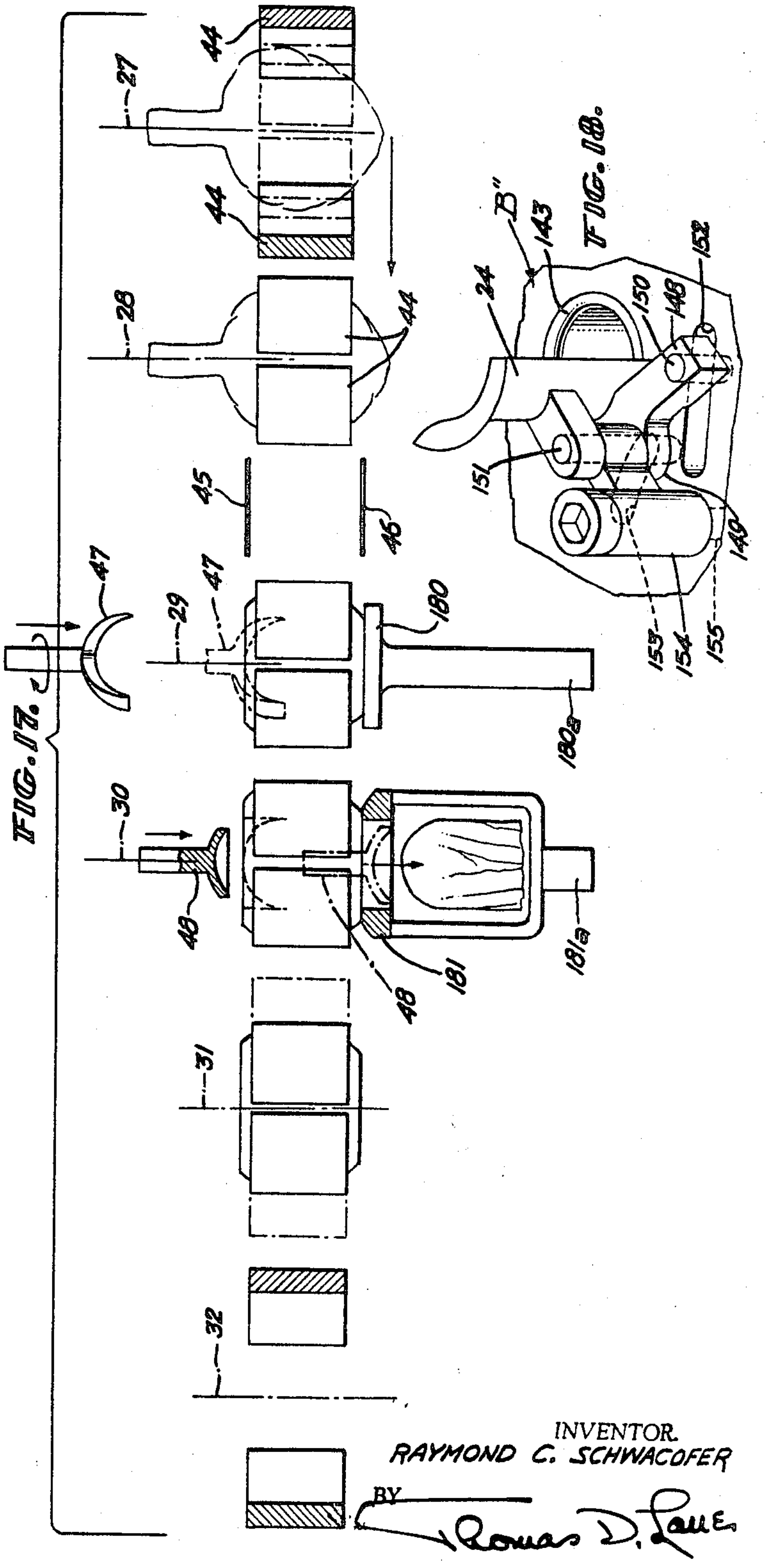
FIG. 17 is a similar straight line diagram showing successive steps in the processing of artichoke hearts.
FIG. 18 is a perspective view of one of the jaws of a three-jaw set employed in processing artichoke bottoms.

Briefly, an illustrative artichoke processing mechanism A embodying the invention is shown in FIGS. 1–11, 18, and diagrammatically in FIG. 16 as it appears when set up for processing artichoke bottoms, and in FIGS. 12–14, and diagrammatically in FIG. 17, for processing artichoke hearts.

Figure 1:
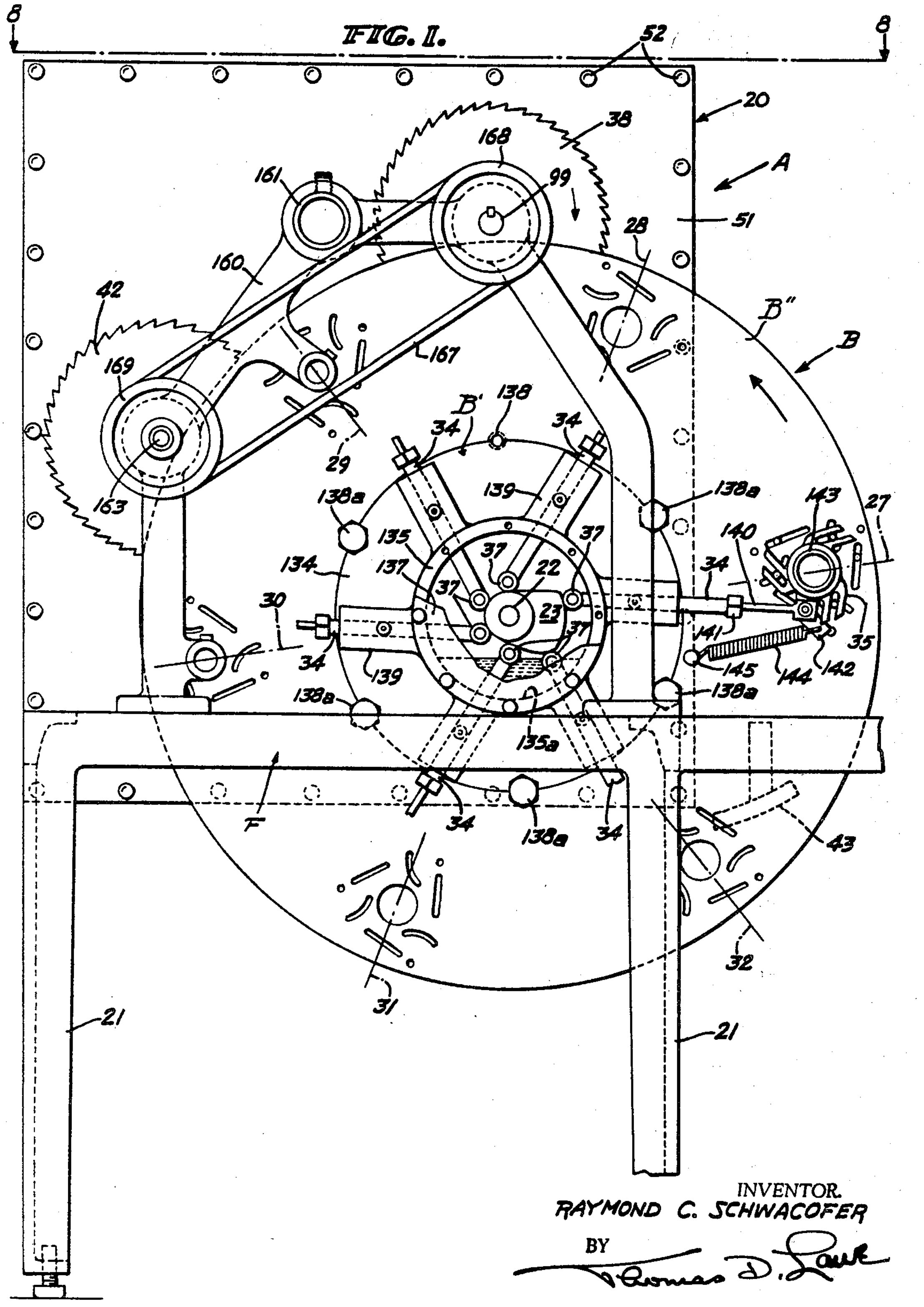
FIG. 1 is a side elevational view of an artichoke processing mechanim embodying the invention, portions thereof being broken away.
Figure 2:
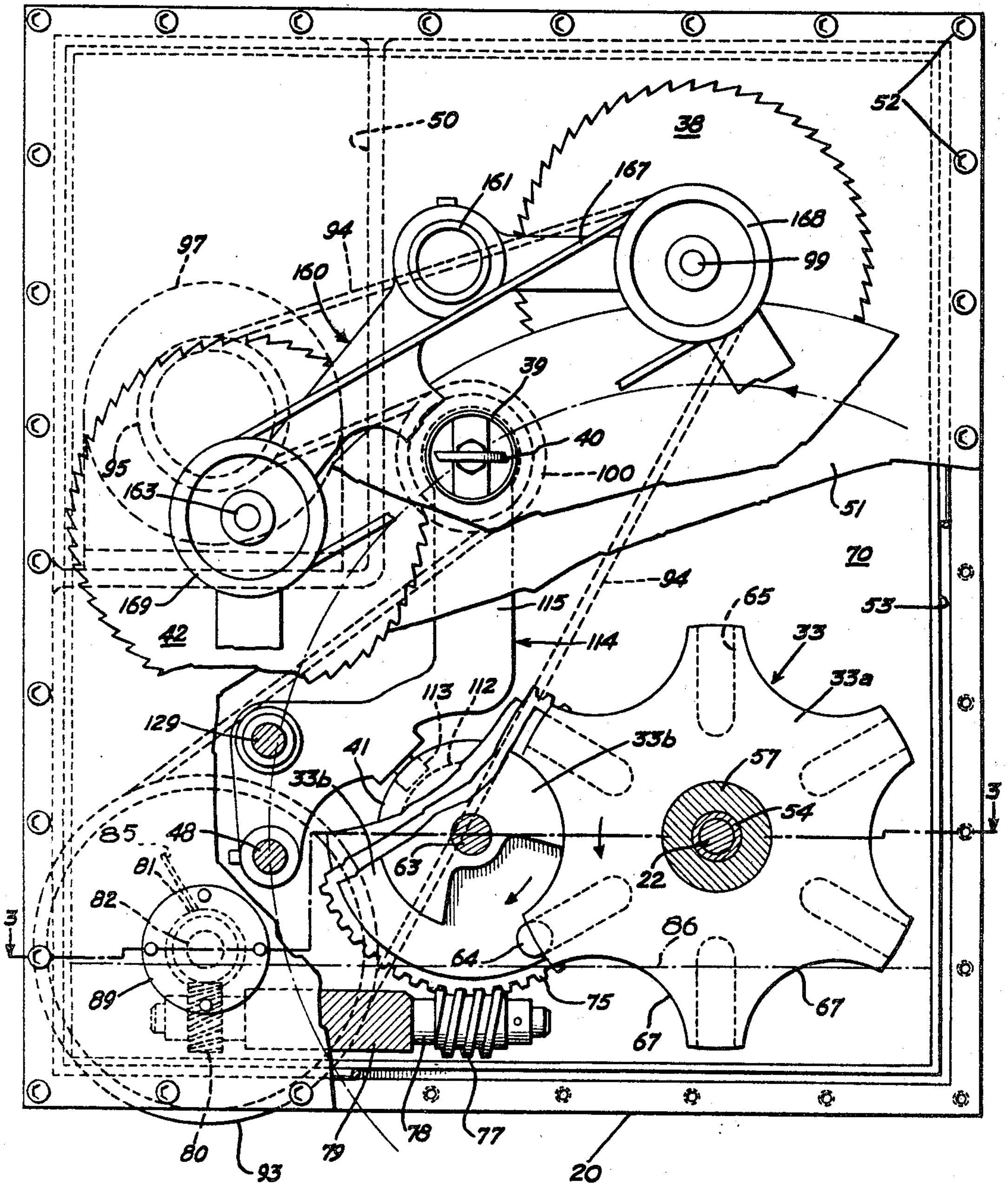
FIG. 2 is an enlarged, side elevational view of the housing portion of the mechanism shown in FIG. 1 with a portion of a removable side plate broken away, the circular path of the centers of the sets of artichoke gripping jaws being shown in a dash-dot line, the saws for processing artichoke bottoms being shown.
Figure 8:
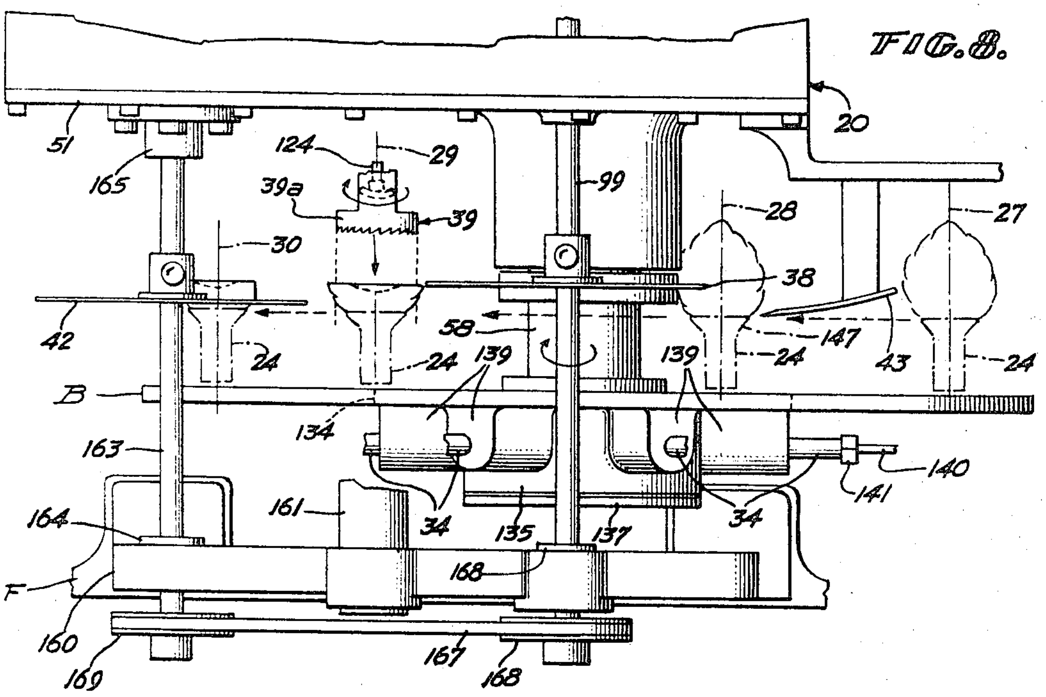
FIG. 8 is a top plan view of the artichoke processing mechanism set up for processing bottoms as shown in FIGS. 1–6, a fragment of the housing being included and portions being broken away.

The mechanism A as set up in FIGS. 1–11 comprises a generally rectangular, oil tight housing 20 mounted on a base frame F supported on legs 21. A rock shaft 22 is journaled in the housing 20, and is subjected to a rocking motion just prior to each advance of an indexing wheel B to actuate a cam 23 to close a set of three artichoke gripping jaws 24 which are located at a feeding station 27 (FIGS. 1 and 8).

The indexing wheel B is journaled on the rock shaft 22, and is advanced intermittently by a conventional, six stage Geneva movement 33. Six three jaw sets of the artichoke grippings 24 are mounted in symmetrically spaced relation around a removable rim portion B'' of the indexing wheel B, and at each advance of the Geneva movement 33, the six sets of jaws are advanced through an angle of 60° each from one station to the next. The six stations of the indexing wheel B, in counter-clockwise sequence from the feeding station 27 as shown in FIG. 1, are designated 27, 28, 29, 30, 31, and 32.

The three jaws 24 of each set are constructed to close around and to grip the stock of an artichoke inserted therebetween. Actuating mechanism for each set of the jaws 24 comprises a push rod 34, which is pivotally connected at its outer end to a rotary slotted cam 35, and on its inner end is provided with a pair of cam follower rollers 37 which ride on the rocking cam 23.

For processing artichoke bottoms, an artichoke is fed into the set of the jaws 24 located at the first, or feeding station 27. The gripping jaws 24 are closed by the rocking cam 23 just prior to each advance of the indexing wheel B by the Geneva movement 33. As each artichoke gripped in its set of jaws 24 is carried past a first cut-off saw 38, the latter severs the bracts or petals of the artichoke (FIGS. 2, 8, and 16) on a plane closely adjacent the receptacle of the artichoke.

At the third station 29, which is just beyond the first cut-off saw 38, a receptacle trimming tool comprising a cylindrical saw 39 (FIGS. 5, 8 and 16) having a central reaming blade 40 mounted therein, is advanced axially by the action of a barrel cam 41 (FIGS. 3 and 4) to trim off the peripheral portion of the artichoke receptacle, and to ream out the central portion thereof.

As each artichoke is advanced from the third station 29 to the fourth station 30 it is carried past a second cut-off saw 42, which severs the trimmed and reamed artichoke receptacle from its stock, and this severed receptacle is the artichoke "bottom," the product of the mechanism A as the latter is set up in FIGS. 1–11.

Just prior to the advance of each set of jaws 24 from the fifth station 31 to the sixth station 32, the rocking cam 23 is swung from its solid to its broken line position of FIG. 1, thereby causing the cam follower rollers 37 on the push rod 34 at the fifth station to ride up on the cam 23 to open the jaws and release the artichoke stock remaining therein. A curved, stationary, extractor cam blade 43 withdraws each artichoke stock axially from the opened gripping jaws as the latter are advanced from the sixth station 32 to return to the first or feeding station 27, leaving the jaws empty and ready to receive another artichoke.

For processing artichoke hearts, the indexing wheel B is adjusted axially inwardly toward the housing 20, and the marginal rim portion B″ of the indexing wheel B, with the six sets of gripping jaws 24 remaining thereon, is removed, leaving a central disk portion B′ of the indexing wheel and the push rods 34.

Six pairs of a different type of artichoke gripping jaws 44 (FIGS. 12 and 13) are then mounted on the indexing wheel central portion B′, and a pair of cut-off saws 45 and 46 (FIG. 14) are mounted in co-axial, axially spaced relation on the same arbor as that used for the first cut-off saw 38 when the mechanism A is set up for processing bottoms. A heart coring knife 47 (FIGS. 14 and 17) is substituted for the receptacle trimming tool saw, and a heart ejecting rod 48, which is not used when the mechanism is set up for processing bottoms, is mounted at the fourth station 30 to eject the artichoke hearts severed from their enclosing bracts or petals by the heart coring knife 47.

*Detailed description*

Referring to the drawings in greater detail, the illustrative mechanism A comprises the rectangular, box-like housing 20 of suitable cast metal, such as steel, with a motor compartment 50 which may be cast integrally therein. A housing side plate 51 is removably mounted on the open front side of the housing 21, and a sealing strip of suitable material, such as neoprene, is provided in a channel 53 around the open end of the housing 20 to provide an oil tight seal between the housing and the side plate.

The rock shaft 22 is journaled (FIG. 3) in a pair of bushings 54 and 55 fitted into opposite ends of a hub 57, which has the Geneva cam **33*a* mounted co-axially on its inner end, and a spacer 58 for mounting the indexing wheel B on its outer end. The hub 57 is journaled in a pair of ball bearings 56 and 56′, which are fitted into the inner and outer ends, respectively, of an outwardly projecting cylindrical wall 61 formed integrally on the removable housing side plate 51. A conventional sealing ring 62 is provided to protect the outer ball bearing 56′** and to prevent the escape of oil from the housing.

Figure 3:
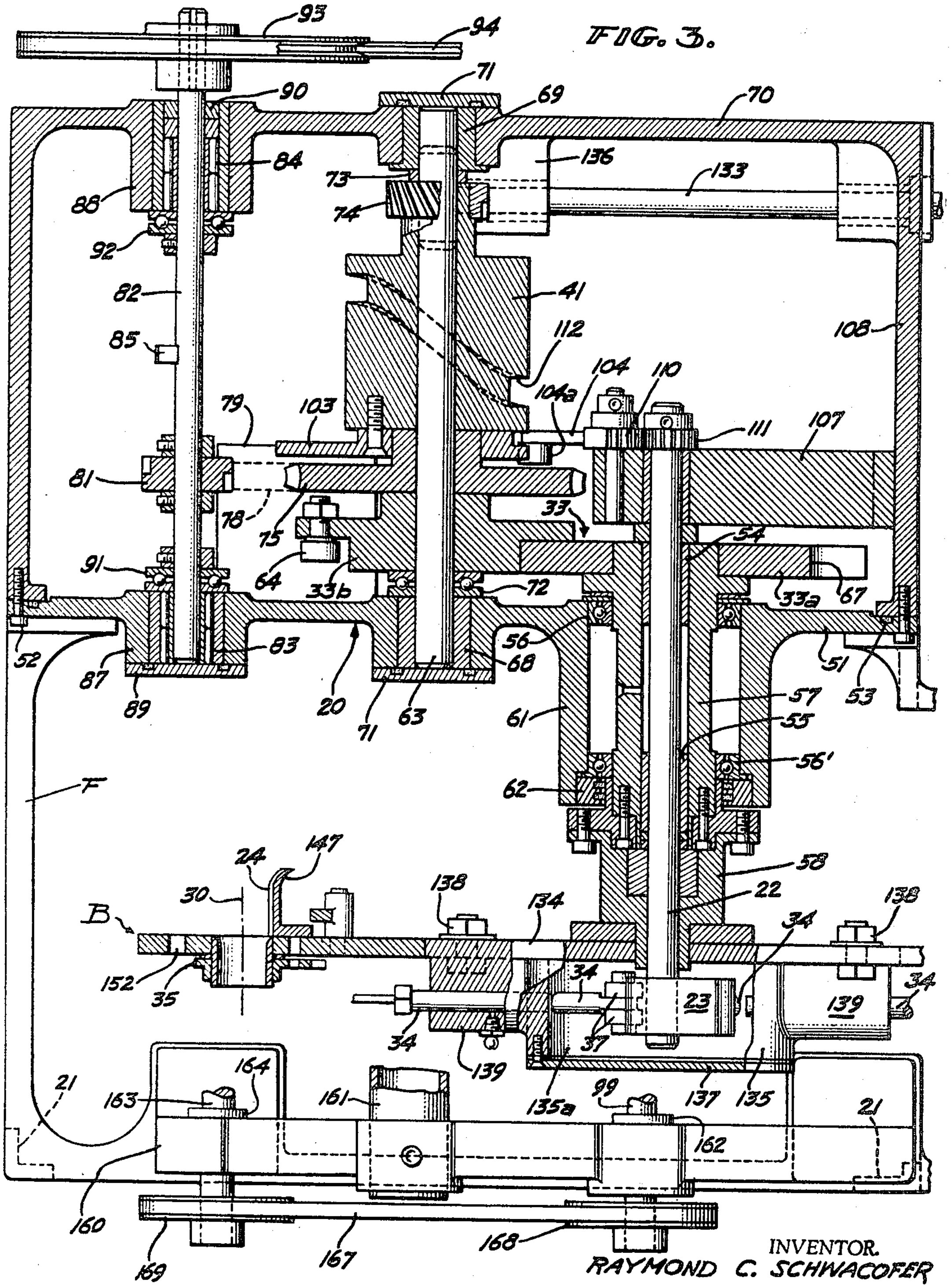
FIG. 3 is a sectional view taken along line 2—2 of FIG. 1.

When setting the mechanism A up for processing artichoke bottoms as in FIGS. 1–11, the spacer 58 is mounted co-axially on the outer end of the hub 57 as shown in FIG. 3, and the indexing wheel B is mounted on the outer end of the spacer 58 co-axially of the rock shaft 22.

The Geneva cam **33*a* on the inner end of the hub 57 is driven by a conventional driver cam 33*b*, mounted on a cam shaft 63. In the usual manner of Geneva movements, for each rotation of the driver cam 33*b*, a roller 64 on the driver cam enters one of six radial slots 65 of the Geneva cam 33*a* and advances the latter rotatably one sixth of a revolution in the direction of the arrow in FIG. 2. The notched, circular periphery of the driver cam 33*b* fits into successive arcuate notches 67 in the periphery of the Geneva cam 33*a*** between successive advances of the latter to anchor the Geneva cam during each interim between successive advances.

The cam shaft 63 (FIGS. 2, 3, and 4) is journaled in bushings 68 and 69 fitted into drilled bosses (FIG. 3) provided on the removable housing side plate 51 and the opposite housing side plate 70, respectively. A sealing disk 71 is provided over each of the bushings 68 and 69. A ball thrust bearing 72 is provided between the removable housing side plate 51 and the driver cam **33*b*, and a thrust collar 73 is mounted between the opposite housing side plate and an auxiliary drive gear 74 on the cam shaft 63**.

A worm gear 75 (FIGS. 2 and 3) secured to the cam shaft 63, is driven by a worm pinion 77 (FIG. 2) mounted on a transverse shaft 78 which is journaled in a bearing standard 79 formed integrally with the removable housing side plate 51. The transverse shaft 78 in turn is driven by helical gears 80 and 81 from a drive shaft 82, which (FIG. 3) is journaled in roller bearings 83 and 84, fitted into drilled bosses 87 and 88, on the housing side plates 51 and 50, respectively. One or more narrow oil flickers 85 (FIG. 2) which may be of flat spring steel, are mounted at required locations on the drive shaft 82. These flickers dip into the oil in the housing, the oil level therein being indicated by the broken line 86, and fill the reservoir with a fog of oil which bathes and lubricates all of the mechanisms therein. A sealing disk 89 covers the outer end of the boss 88, while a conventional sealing ring 90 is provided for the rear bearing 84, through which the drive shaft extends. Ball thrust bearings 91 and 92 absorb thrust forces imposed on the drive shaft 82 by the action of the helical gears 80 and 81.

Figure 15:
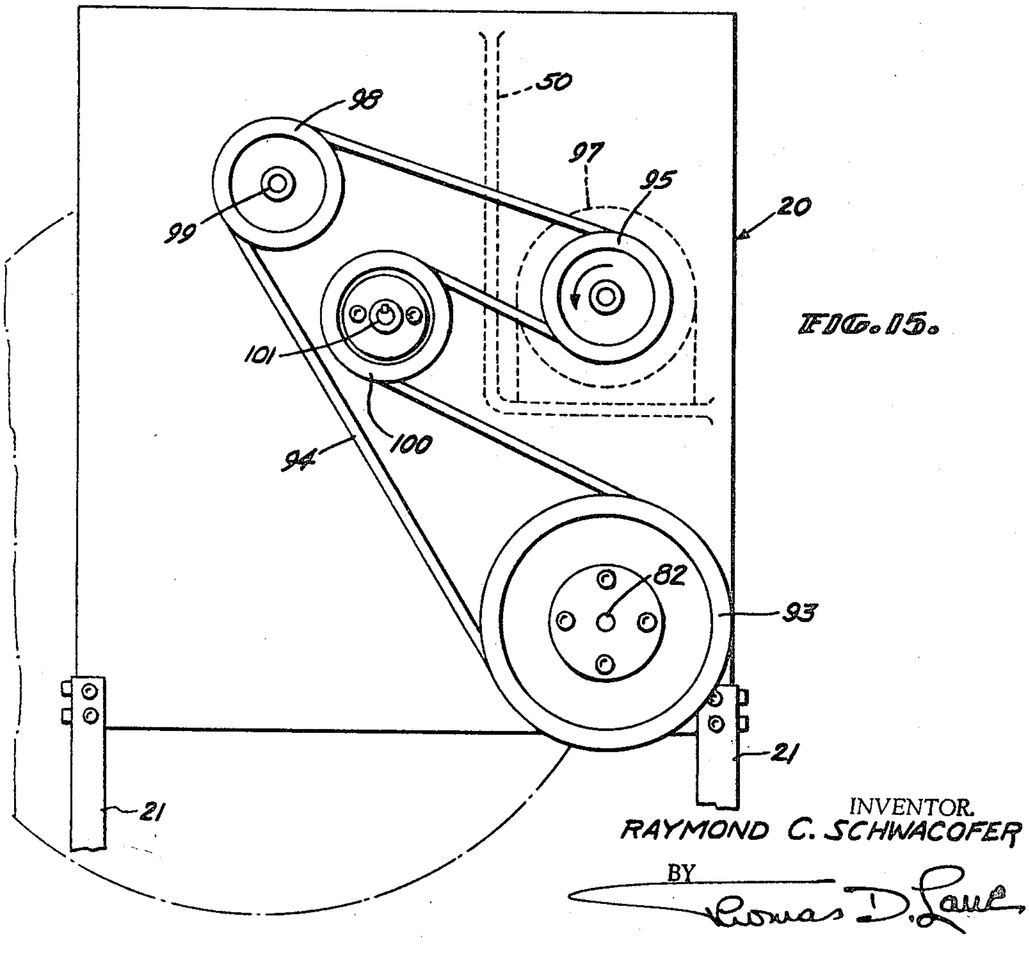
FIG. 15 is a rear elevational view of the housing portion of the mechanism showing a drive belt, the circular path of the jaw centers being shown in a broken line.

A grooved drive pulley 93 is secured to the projecting portion of the drive shaft 82, and is driven by a V-belt 94, which as best shown in FIG. 15, also passes around a pulley 95 on the drive shaft of an electric drive motor 97, a pulley 98 on a saw arbor 99, and a pulley 100 on a keyed bushing which drives the trimming and coring spindle 101, and which will be described later herein. The electric drive motor 97 is mounted in the housing motor compartment 50, shown in broken lines in FIGS. 2 and 15.

Figures 4, 5, 6, 7:
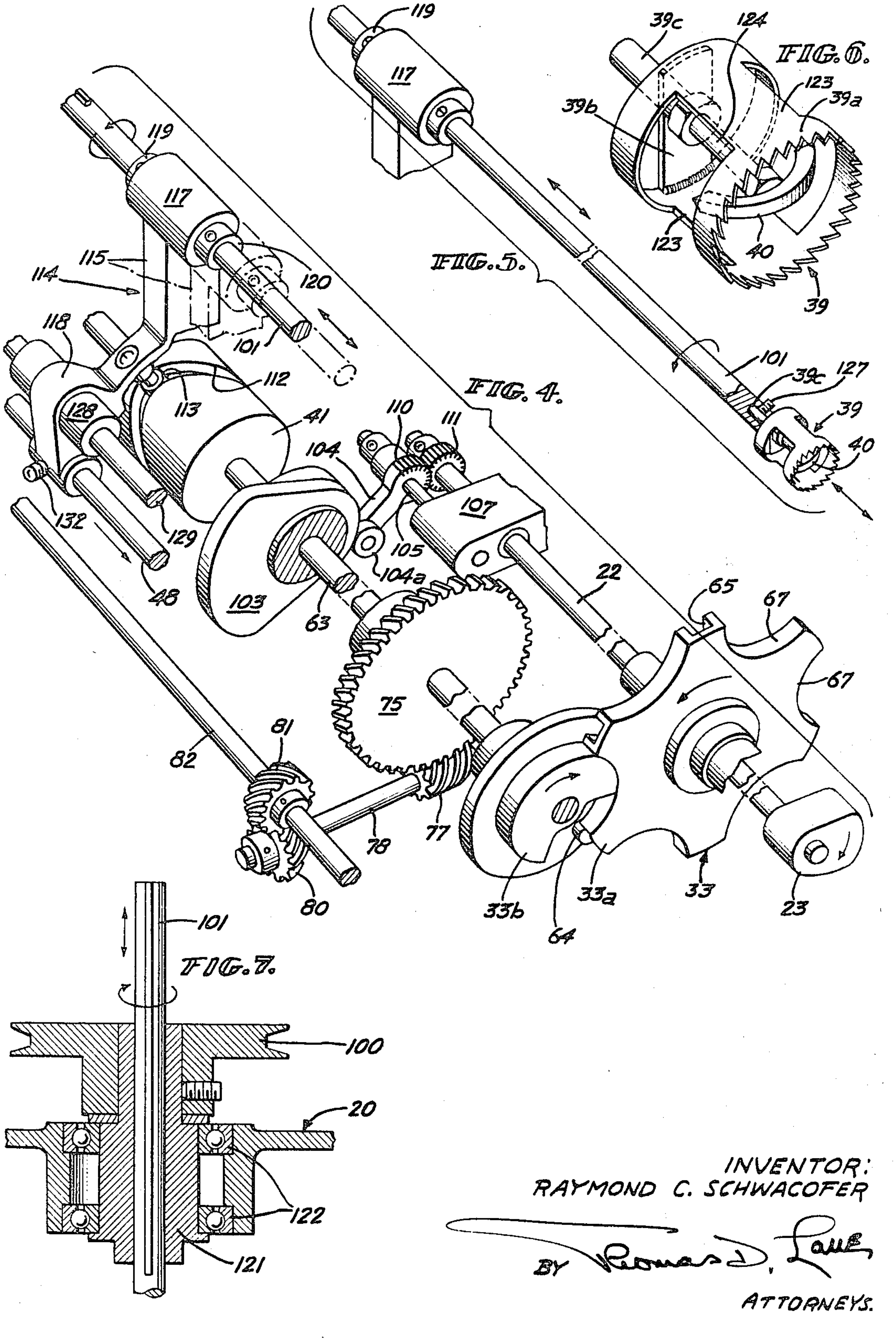
FIG. 4 is a fragmentary, somewhat diagrammatic, perspective view of portions of the drive mechanism shown in FIGS. 2 and 3, portions being broken away, the axial separation of the elements on the shafts being increased to better illustrate their respective structures.
FIG. 5 is a fragmentary, perspective view of the artichoke bottom trimming cylindrical saw mounted on its rotary, reciprocating spindle, portions being broken away.
FIG. 6 is an enlarged, perspective view of the cylindrical saw of FIG. 5 as it appears when removed from its spindle.
FIG. 7 is a sectional view showing the drive mechanism for the spindle of FIG. 5.

Returning now to the cam shaft 63 and the elements mounted thereon, a high-low cam 103, best illustrated in FIG. 4, is mounted on the cam shaft 63 and actuates a rocking lever 104 mounted on a stub shaft 105 which is journaled in a hole provide therefor in a standard 107 (FIGS. 3 and 4) which projects from the housing end plate 108.

A gear segment 110 is provided on the hub of the rocking lever 104, and is in mesh with a pinion 111 on the rock shaft 22. The cam 103 is rotatively adjusted, relative to the Geneva driver cam **33*b*, so as to swing the rock shaft 22 and the jaw actuating cam 23 thereon in the direction of the arrow in FIG. 4 during each interim or dwell of the Geneva cam 33*a***, and just prior to each advance thereof.

As will be noted in FIGS. 1 and 12, the push rods are mounted with their axes offset in a counter-clockwise direction from, but substantially parallel to, a radius of the indexing wheel. This offsets the rollers in a counter-clockwise direction relative to the rocking cam 23, so that the tension of the jaw-closing springs 144 (FIG. 1) and 178 (FIG. 12) to be referred to later herein, urge the rocking cam 23 constantly in a counter-clockwise direction to retain the cam follower roller **104*a* on the lever arm 104 in contact with the high-low cam 103**.

The barrel cam 41 is also mounted on the cam shaft 63, and has a sinuous cam groove 112 circumferentially therearound so as to move a cam follower roller 113, operating in the groove, and a sliding head 114 upon which the roller 113 is mounted, through one complete, reciprocating cycle for each revolution of the cam shaft 63. The sliding head 114, best shown in FIGS. 2 and 4, has an upwardly projecting arm 115 with a bearing 117 at its upper end in which is journaled the spindle 101 for the cylindrical trimming saw 39. The sliding head 114 also has a laterally and downwardly extending arm 118 to be referred to later herein.

Collars 119 and 120 are secured in axially adjusted position to the spindle 101, one on each side of the sliding head top bearing 117, so as to move the spindle 101 reciprocally with the sliding head 114. The spindle 101 extends through both the removable front side plate 51 and the rear side plate 70. In the front side plate 51, this spindle is journaled in a sealed bearing, not shown, like the rear drive shaft bearing 84 of FIG. 3. In the rear plate 70, however (FIG. 7), the spindle 101 has sliding keyed connection to a rotatable bushing 121 which is journaled in ball bearings 122. The grooved drive pulley 100 referred to previously herein is mounted on the rotatable bushing 121.

The cylindrical trimming saw 39 (FIGS. 2, 5, and 6) comprises a cylindrical portion **39*a* of tool steel, with side openings 123 therein to permit the centrifugal discharge of waste matter therethrough. The axially outward or leading edge of the saw cylinder is serrated, to provide an annulus of saw teeth which trim off the tough, marginal portion of the artichoke receptacle. A mounting plate 39*b* is welded transversely across the inner end of the saw cylinder, and a tubular shank 39*c* is welded into a hole in the center of the mounting plate 39*b* co-axially of the cylinder 39*a***.

The curved reaming blade 40 is mounted transversely on the end of a shank 124, and the axially outward edge of the reaming blade 40 is sharpened in a manner generally similar to the lips of a conventional twist drill. The blade shank 124 is inserted into the tubular saw shank **39*c*, and is held in axially adjusted position therein by a jamb nut 125 (FIG. 6). The tubular saw shank 39*c* in turn is fitted into an axial hole in the end of the spindle 101, and is secured in axially adjusted position therein by a set screw 127** (FIG. 5).

In the laterally and downwardly extending arm 118 of the sliding head 114 is mounted a support bushing 128, which has slidable support on a fixed rod 129. The latter is mounted in drilled bosses (not shown) provided on the inner sides of the housing side plates 51 and 70, respectively.

Also in the downwardly extending arm 118 of the sliding head 114, and just below the support bushing 188, the artichoke heat ejecting rod 48 is secured in axially adjusted position by a set screw 132.

The heart ejecting rod 48 extends for axial slidable movement through a conventional bushing (not shown) provided therefor in the removable front plate 51, but is used only when the mechanism is set up for processing artichoke hearts as shown in FIGS. 12–14 and 17 and as will be described later herein.

The barrel cam 41 is rotatively so positioned on the cam shaft 63 is in mesh with a second helical gear (not advances of the Geneva cam **33*a* the sliding head 114 will be moved axially forwardly to its limit of movement, and then back again far enough so that all axially moving elements carried by the sliding head 114** will clear the artichokes at their respective stations before the next advance of the Geneva cam.

The helical, auxiliary drive gear 74 (FIG. 3) on the cam shaft 63 in mesh with a second helical gear (not shown) mounted beneath it on a forwardly extending auxiliary drive shaft 133, which is provided for driving an artichoke feeding mechanism, not shown. The auxiliary drive shaft 133 is journaled in a standard 136 formed integrally within the housing rear side plate 70 and also extends through a sealed bushing in the housing end plate 108. The drive ratio between the cam shaft 63 and the auxiliary drive shaft 133 preferably is one-to-one.

The central disk portion B′ of the indexing wheel B comprises a metal disk 134, with a co-axial cylindrical wall 135 defining a central oil chamber **135*a* in which the jaw actuating cam 23 operates. This oil chamber 135*a* is sealed by a metal closure disk 137 secured to the outer end of the cylindrical wall 135** (FIG. 3).

The removable rim portion B″ of the indexing wheel is annular, and its central opening is of a size to fit snugly onto the periphery of the central disk portion B′. A plurality of matched threaded holes 138 (FIG. 1) are provided in symmetrically distributed relation with their axes on the line of juncture of the center disk portion B′ and outer rim B″. Bolts **138*a*** are screwed one into each of these threaded holes, and thereby firmly secure the rim B″ in co-planar relation on the indexing wheel center disk portion B′.

The push rods 34, of which there are six, one for each set of artichoke gripping jaws, are mounted for axial slidable movement in six radially extending, drilled bosses 139 on the cylindrical oil chamber wall 135. As mentioned previously herein, each push rod, as shown in FIGS. 1 and 12, is offset counter-clockwise from and is parallel to, a radius from the axis of the rock shaft 22. Each push rod 34 terminates at its outer end slightly beyond the periphery of the central disk 134, and has an axial socket in its outer end for receiving an extension rod 140 when the mechanism is set up as in FIGS. 1–11 for processing artichoke bottoms.

Each extension rod 140 is secured in axially adjusted position in its socket by a jamb nut 141, and the outer end of each push rod extension 140 is pivotally connected to an arm 142 on its associated, rotatively mounted, jaw actuating cam 35. Each of the latter is journaled for rotative movement on a tubular bushing 143 press-fitted into a hole provided therefor in the removable outer rim portion B″ of the indexing wheel. A coil spring 144 is held in tension between the arm 142 on each rotatively mounted cam 35 and a pin 145 (FIG. 1) to urge the cam 35 toward jaw-closing condition.

Each set of artichoke gripping jaws comprises three generally similar jaws 24 (FIGS. 3, 8, 10, 11 and 18), each jaw having a concavely curved, ribbed, radially inward face and an outwardly flared, axially outward end portion 147 (FIG. 3). The concave inner faces of the jaws are curved to fit and grip the stocks of a selected range of artichoke sizes it is intended to process during a particular run of the mechanism A, while the flared end portion 147 provides a seat for the receptacle portion of an artichoke inserted in the open jaws, and insures proper positioning of each artichoke in the jaws. Different sizes of jaws are provided for different sizes of artichokes to be processed.

Each jaw 24 (FIGS. 10, 11 and 18) has two angularly extending legs 148 and 149 on the base portion thereof which ride slidably on the opposite side of the indexing wheel rim portion B″ from the rotary cam 35. A pair of guide pins 150 and 151 are provided on the legs 148 and 149, respectively, and each pair of these pins ride, respectively, in a pair of elongated, slotted openings 152 and 153. Three pairs of these slotted openings are provided in symmetrically arranged relation around each bushing 143 in the rim B″, one pair for each jaw.

A guide link 154 is pivotally connected to the axially outward side of each jaw 24 and also to an anchor pin 155 mounted on the rim portion B″. The slots 153 are curved co-axially of their respective link anchor pins 155, and the pins 151 on the under side of the shorter leg 149 of each jaw 24 ride in these curved slots, and are of sufficient length to extend beyond the opposite face of the indexing wheel rim B″, where they each ride in one of three diagonally extending cam notches 157 in the rotatively mounted cam 35.

The other guide pins 150 are shorter than the pins 151, and do not extend beyond the opposite face of the rim B″ from the jaws 24. The shorter guide pins 151 ride in the straight guide slots 152, which are so positioned, relative to the link anchor pin 155 and the curved guide slot 153 as to maintain the concave inner face of each jaw 24 co-axial with the bushing tube 143 of its rotary cam 35 throughout the inward and outward movement of its jaw, as will be noted in FIGS. 10 and 11.

Figure 9:
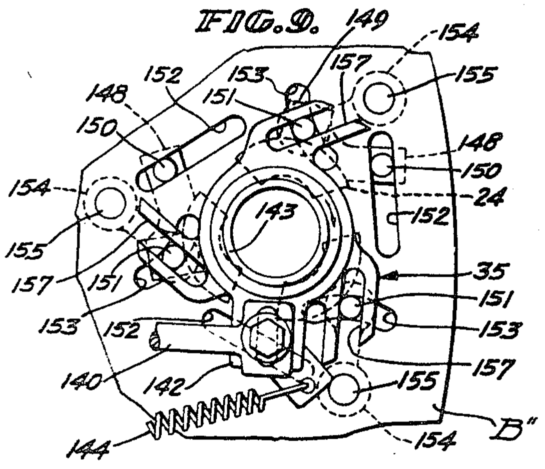
FIG. 9 is an enlarged, fragmentary, side elevational view of a marginal portion of the indexing wheel as it appears when set up for processing artichoke bottoms, the rotary cam for operating one set of three artichoke gripping jaws being shown in counter-clockwise, rotated, jaw open position.
Figure 10:
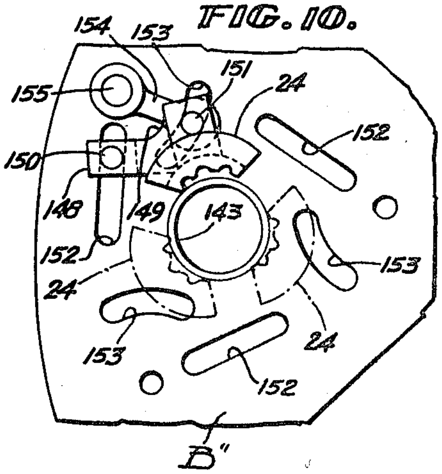
FIG. 10 is a similarly enlarged, fragmentary, side elevational view of the opposite side of FIG. 9, and showing one only of the jaws in its open position.
Figure 11:
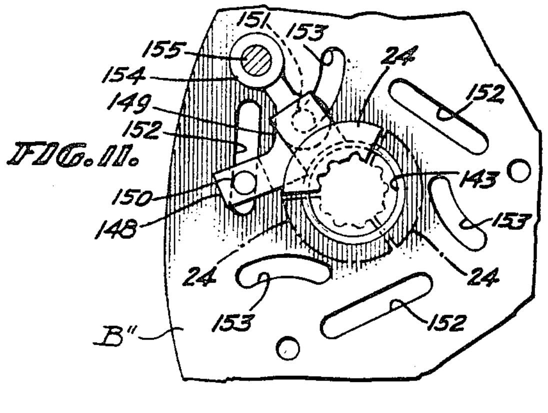
FIG. 11 is a fragmentary outer side elevational view similar to FIG. 10, but with the jaw in its closed position.

When the push rod cam follower rollers 37 are on the low portion of the rocking cam 23, the spring 144 urges the rotary cam 35 in a clockwise direction as shown in FIGS. 1 and 9, thereby urging the pins 151, one of which rides in each of the diagonal notches 157 in this cam, toward the left hand ends of their respective curved slots 153 in the direction of rotation around the axis of their common bushing 143. Since the curved slots 153 are inclined inwardly toward the axis of the bushing 143, this action moves the jaws inwardly toward each other from the position of FIG. 10 to that of FIG. 11, thereby to grip an artichoke stock when the latter is present between the jaws during such closing.

When the cam follower rollers 37 on the inner end of each push rod 34 ride onto the high portion of the rocking cam 23, the push rod urges the rotary cam 35 in a counter-clockwise direction as shown in FIGS. 1 and 9 to open the jaws and release an artichoke stock gripped therein.

The feeding station 27 where the artichokes are fed into the gripping jaws 24 is shown in FIG. 1 with the rocking cam 23 in what may be considered its normal condition, i.e., with the cam follower roller **104*a* on the rock-shaft actuating lever 104 on the low point of the cam 103** as in FIG. 4.

During each dwell of the Geneva movement 33, and just prior to each rotative advance of the indexing wheel B, the cam follower roller **104*a* rides onto the high portion of the cam 103, thereby rocking the rock shaft 22 and the rocking cam 23 mounted thereon in a clockwise direction which moves the rocking cam to its broken line position of FIG. 12. This allows the coil spring 144 at the feeding station 27 to move the jaws 24** associated therewith to their closed condition to grip the stock of an artichoke inserted therein.

An upright outer frame 160 (FIGS. 1, 3, 8 and 12) is mounted on the base frame F outwardly of the indexing wheel B, and this frame 160 is securely held in upright position by a tubular brace 161 which is anchored in a hole provided therefor in the frame 160 and also in a socket, not shown, on the outer face of the removable side plate 51.

The outer end of the cut-off saw arbor 99 is journaled in a bearing 162 on the upright frame 160. The first artichoke cut-off saw 38 is mounted on the saw arbor 99, and is adjusted axially thereon so as to cut off the leaves or bracts of each artichoke carried past it by the indexing wheel B substantially flush with the axially outward portion of the artichoke receptacle.

The second cut-off saw 42 is mounted on a shaft 163 which is journaled in a second bearing 164 on the frame 160, and also in a bearing (FIG. 8) in a socket 165 provided on the removable side plate 51. A V-belt 167 passes around grooved pulleys 168 and 169 mounted on the outer ends of the saw arbor 99 and shaft 163, respectively.

The second cut-off saw 42 is adjusted in axially offset relation to the first cut-off saw 38 and in position to just clear the axially inward end of the receptacle of each artichoke, so that after the receptacle has been trimmed and reamed by the combined cylinder saw 33 and reaming blade 40 at station 29, the receptacle is severed from the stock by the second cut-off saw 42 to thereby form the artichoke "bottom."

As each set of jaws arrives at the sixth station 32, the one before the feeding station 27, it will be obvious from FIG. 1 that the cam follower rollers 37 of its push rod 34 will be on the high portion of the jaw actuating rocking cam 23, and that therefore the jaws 24 will be in their open condition to release a stock that may remain therein. To insure removal of these stocks prior to the arrival of each set of jaws at the feeding station 27, the stationary curved, extracting cam blade 43 is mounted in the path of movement of the radially inward side of the stock, and beneath the enlarged outer end of the stock as the jaws move from station 32 toward the feeding station 27. The extracting cam blade 43 curves away from the plane of the indexing wheel B and thus tends to withdraw each stock axially from its opened jaws as the latter travel between station 32 and the feeding station 27.

*Operation*

Operation of the mechanism A when set up for processing bottoms as shown in FIGS. 1–11 will be described for a single set of gripping jaws as follows: Each set of gripping jaws arrives at the feeding station 27 with the jaws empty, and held open by the push rod rollers 37 resting on the high point of the rocking cam 23. The jaws remain open until just before the indexing wheel B is advanced by the Geneva cam **33*a*, at which time the rock shaft 22 is actuated by the high-low cam 103 to swing the rocking cam 23 in a clockwise direction as illustrated in FIG. 12, thereby allowing the rollers 37 to drop onto the low portion of the cam 23, and permitting the tension spring 144** to close the jaws to seize the stock of an artichoke which has been inserted herein while the grippers are open at the feeding station.

The indexing wheel B then moves the jaws 24 from the first or feeding station 27 to the second station 28, where no processing is performed on the artichoke since it is desired to leave this zone clear to avoid possible injury to an operator.

Upon moving from the second station 28 to the third station 29, the artichoke is carried past the first cut-off saw 38, which is driven rotatively by the V-belt 94 on the rear of the housing 20, which saw severs the bracts from the receptacle of the artichoke.

During the interim or dwell at the third station 29, the cylindrical saw 39 with its reaming blade 40, also driven rotatively by the belt 94 on the rear of the housing 20, is advanced axially by the action of the barrel cam 41 to trim off the peripheral portion of the receptacle of the artichoke, and to ream out the end of the receptacle which contains the bases of the so-called "choke" of the artichoke. The cylindrical saw 39 is withdrawn by the action of the barrel cam 41 sufficiently to clear the portion of the artichoke remaining in the jaws 24 at the third station 29 before the next advance of the indexing wheel B.

Upon the next advance of the indexing wheel, which moves the jaws from the third to the fourth station 30, the remaining portion of the artichoke is carried past the second cut-off saw 42, which severs the marginally trimmed and reamed receptacle or "bottom." The latter, falling free, is caught in any suitable manner, for example, on a usual conveyor belt or in a container (not shown), mounted beneath the point of its severance.

The stock remains in the jaws, which remain closed as they are carried past the fourth station 30 to the fifth station 31. Just prior to the next advance of the indexing wheel, which moves the jaws from the fifth station 31, the counter-clockwise swing of the rocking cam 23 moves the high portion of the latter cam beneath the rollers 37 to open the jaws 24. The jaws remain open at the sixth station 32 and throughout their final advance from the sixth station 32 back to the feeding station 27 to complete their orbit. When the jaws are opened the stock therein may fall out by gravity, but if not, it is withdrawn by the action of the curved extractor cam 43 as the jaws are advanced from the sixth station 32 back to the feeding station 27.

For setting up the mechanism A for processing artichoke hearts as shown in FIGS. 12–14, and diagrammatically in FIG. 17, the push rod extensions 140 are removed, as are also the bolts 138a for securing the rim portion B'' of the indexing wheel on the center disk B'. The rim portion B'' is then removed, and a cross head 170 is mounted on the outer end of each push rod 34. A pair of toggle links 171 and 172 are pivotally connected between each cross head 170 and its associated pair of the jaws 44.

Each jaw is pivotally mounted at its inward end on an eccentric portion 173 (FIG. 13*a*) of a stud 174 which is secured in rotatively adjusted position in a threaded hole provided therefor in the central portion B' of the indexing wheel as shown in FIGS. 12 and 13, one on each side of each push rod 34. Rotative adjustment of the studs 174 permits accurate centering of the jaws and the artichoke gripped therein, which is very important at the coring station 29, and the heart ejecting station 30.

Each jaw 44 comprises a support arm portion 44a and a head portion 44b. A head 44b is mounted on the outer end of each arm portion 44a, and comprises a support block 175 with a curved jaw portion 177 thereon, the concave side of which is of a diameter approximating that of the smallest artichoke to be gripped therein. Several different sizes of jaws may be provided to accommodate the complete range of sizes of artichokes which may be encountered. The concave surface of each jaw portion 177 preferably is ribbed to provide a firmer grip on an artichoke gripped therein.

A pair of coil springs 178 are mounted in tension transversely between each pair of jaws 44 to urge them toward closed, artichoke gripping position. Outward movement of the push rod 34 by the rocking cam 23 forces the toggle links 171 and 172 outwardly to open the jaws.

Also when setting up the mechanism A for processing artichoke hearts, the central disk portion B' of the indexing wheel is moved axially inwardly toward its hub 57 by removing the spacer 58 (FIG. 3) and substituting therefor a shorter mounting member 179 (FIG. 14).

The co-axial cut-off saws 45 and 46 are mounted in axially spaced relation on the saw arbor 99 and are adjusted thereon so that the outer saw 45 trims off the stock on the axially inward side of the jaws 44, and the saw 46 trims off the tip ends of the bracts along a desired plane axially outwardly of the jaws as the artichoke is advanced from station 28 to station 29. The second cut-off saw 42 on the shaft 163 is not used in processing hearts, and may either be removed, or moved axially on its shaft to a position where it is endwise clear of the artichokes as they are carried past it.

The cylindrical saw 39 and its reaming blade 40 are removed from the spindle 101 and are replaced by the three bladed, cup-shaped coring knife 47, which is adjusted axially of the spindle 101 to advance to a point where its cup-shaped inner edge just touches the saw-trimmed receptacle end of each artichoke at station 29. This coring knife severs the receptacle end of the heart of each artichoke from the surrounding coarser and less edible bracts, and rounds off the receptacle end of the heart. The ejector rod 48 at station 30 is adjusted axially in the sliding head 114 so that upon each advance thereof by the barrel cam 41, the ejector rod will push the severed heart, which was freed by the coring knife 48 at the preceding station, from the surrounding bracts, which are left gripped in the jaws 44.

*Operation in processing hearts*

The operation of the mechanism when set up for processing artichoke hearts as in FIGS. 12–14, and as illustrated in straight line diagram in FIG. 17, is as follows: As each pair of jaws 44 arrive in their open condition at the feeding station 27, an artichoke is fed in axially centered position substantially co-axially between the jaws with the stock end of the artichoke on the right hand, or housing, side of the jaws. Just prior to each advance of the indexing wheel, as represented by the central portion B' thereof, the rocking cam 23 is swung clockwise to its broken line position as shown in FIG. 12 by the action of the high-low cam 103. This action allows the push rod rollers 37 at the feeding station 29 to drop onto the low portion of the cam 23, and the springs 178 to close the jaws 44 and grip the artichoke fed therein. The indexing wheel then advances the jaws, first to the second station 28 and then past the co-axial cut-off saws 45 and 46 to the third station 29. As the jaws pass the trimming saws 45 and 46 both ends are trimmed from the artichoke, the stock end being trimmed off flush with the receptacle, and the tip ends of the bracts being trimmed off to the length desired for the finished artichoke heart. As the indexing wheel B' is at rest at the third station 29, the coring knife 47, rotatively driven by the belt 94 on the rear of the housing 20, is advanced co-axially into the artichoke and severs the central portion or heart of the artichoke from the surrounding bracts, and also rounds off the receptacle end of the heart by reason of the cup-shaped coring knife. The axial thrust of the coring knife on the artichoke is resisted by a disk shaped thrust plate 180, having a shank portion 180a which is anchored in a hole provided therefor on the upright frame 160. The coring knife is withdrawn clear of the artichoke prior to the next advance of the indexing wheel B' which moves the artichoke to the fourth station 30. There the heart ejecting rod 48 is advanced by the barrel cam 41 to push the severed heart from the surrounding bracts of its artichoke. The thrust of the ejecting rod is prevented from displacing the bracts from which the heart is ejected by an annular thrust ring 181, which, like the thrust disk 180, has a shank portion 181a thereof anchored in a hole provided therefor in the upright frame 160 in axial alignment with the heart ejector rod 48. The thrust ring 181 is adjusted axially its hole in the upright frame 160 so as to just clear the cut-off tip of each artichoke as it arrives at the fourth, or heart ejecting station 30, and the central opening in the ring is of a size to permit the heart, under the urging of the ejector rod 48, to pass therethrough. Sufficient clearance is provided between the thrust ring 181 and its stem 181a to permit the ejected heart to drop clear where it can be caught on a conventional conveyor belt or in a suitable receptacle, not shown. The ejector rod, like the coring knife 47, is withdrawn clear of the path of the artichokes prior to the next advance of the indexing wheel B'. The bracts, with the heart thus removed therefrom, remain gripped in the jaws 44 until the latter arrive at the fifth station 21, where the jaws are opened as the rocking cam 23 is swung clockwise in FIG. 12 to its broken line position, whereupon the remaining bracts drop by gravity from the opened jaws, leaving them empty and ready to move through the sixth station 32 and on into the feeding station 27, ready to receive another artichoke.

The invention provides a mechanism which is capable of high speed, trouble free, continuous operation. It requires little or no maintenance with the exception of an occasional replacement of the saws for sharpening and of the heart severing coring knife when used for producing hearts. All of the moving parts in the housing 20 are bathed in oil, as are those in the central oil reservoir in the indexing wheel, while the few remaining bearings may be provided with grease fittings which require only infrequent oiling.

The mechanism permits rapid and easy conversion from the processing of artichoke hearts to bottoms and vice versa, so that in the event that a line of these machines should be in the act of processing hearts from young and more tender artichokes, and, either through the advance of the season or for other reasons a quantity of larger, tougher artichokes should be received, which would not lend themselves to the processing of hearts, the machines or any desired number of them could be rapidly converted for the processing of bottoms and the operation continued with minimum loss of time, money and artichokes.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. An artichoke processing mechanism comprising:
an indexing wheel,
Geneva drive mechanism operatively mounted to advance the indexing wheel intermittently with a dwell between successive advances thereof,
a plurality of pairs of artichokes gripping jaws mounted in symmetrically spaced relation about the indexing wheel,
an independently adjustable eccentric pivot pivotally supporting each jaw, all of the pairs of jaws being located to close about centers at equal distances from the axis of rotation of the indexing wheel,
each pair of jaws in a condition of dwell of the Geneva movement defining a station, each pair of jaws being advanced successively from one station to the next upon each rotative advance of the indexing wheel by the Geneva drive mechanism,
means for closing each pair of jaws at a selected one of the stations defined as a feeding station to grip an artichoke fed between the jaws at the feeding station,
a rotatively driven cut-off saw mounted in the path of movement of an artichoke gripped between a pair of the jaws upon rotative advance of the pair of jaws from the feeding station toward a successive station identified as a processing station,
artichoke processing means at the processing station,
means for axially advancing the processing means into operative, trimming relation with an artichoke gripped between the pair of jaws at the trimming station during each dwell of the Geneva drive mechanism,
means for opening each pair of jaws after the latter have passed the processing station,
an ejector mounted in the path of a processed artichoke remaining in each pair of jaws during its movement from the processing station back to the feeding station to eject the processed artichoke from the jaws.

2. An artichoke processing mechanism as claimed in claim 1 wherein the Geneva mechanism, the indexing wheel and the ejecting mechanism are all mounted on an oil tight reservoir, and oiling means are provided to distribute lubricating oil from a supply thereof in the reservoir to bearing surfaces of all of said mechanisms mounted on the reservoir.

References Cited

UNITED STATES PATENTS

| | | | |
|---|---|---|---|
| 1,886,388 | 11/1932 | Gardner | 146—52 X |
| 2,204,846 | 6/1940 | Dotta | 146—81 |
| 2,342,131 | 2/1944 | Erickson | 146—52 |
| 3,075,634 | 2/1963 | Schwacofer | 198—210 |

W. GRAYDON ABERCROMBIE, *Primary Examiner.*